United States Patent
Muhrer et al.

(10) Patent No.: US 6,645,886 B1
(45) Date of Patent: Nov. 11, 2003

(54) GLOW PROTECTION BAND

(75) Inventors: Volker Muhrer, Fuerth (DE);
Wolfgang Rogler, Möhrendorf (DE);
Klaus Schaefer, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/786,061

(22) PCT Filed: Aug. 16, 1999

(86) PCT No.: PCT/DE99/02559
§ 371 (c)(1),
(2), (4) Date: Jul. 2, 2001

(87) PCT Pub. No.: WO00/13191
PCT Pub. Date: Mar. 9, 2000

(30) Foreign Application Priority Data

Aug. 28, 1998 (DE) .......................................... 198 39 285

(51) Int. Cl.[7] .............................................. B32B 27/04
(52) U.S. Cl. ..................... 442/139; 428/375; 428/413; 442/110; 442/172; 427/386.6; 427/389.9; 427/544
(58) Field of Search ................................ 428/413, 324, 428/364, 368, 375; 525/481, 485, 523, 524, 533, 534; 427/386, 389.9, 389.1, 544; 442/110, 139, 172

(56) References Cited

U.S. PATENT DOCUMENTS

| | | |
|---|---|---|
| 3,066,180 A | 11/1962 | Virsberg et al. |
| 4,373,013 A | 2/1983 | Yoshizumi |
| 5,319,276 A | 6/1994 | Schuler |
| 5,723,920 A * | 3/1998 | Markovitz et al. ............. 310/42 |
| 6,043,582 A * | 3/2000 | Markovitz et al. ........... 310/213 |

FOREIGN PATENT DOCUMENTS

| | | | |
|---|---|---|---|
| DE | 30 45 462 A | * | 6/1981 |
| DE | 0 573 796 A | * | 12/1993 |
| DE | 42 18 928 | | 12/1993 |
| US | EP 0422 928 A1 | * | 10/1990 |

OTHER PUBLICATIONS

The Condensed Chemical Dictionary, Litton Education Publishing, Eighth Edition, p. 3.*
DIN 12395.
DIN 1EC 167, VDE 0303, Part 31 and Part 61, Section 7.
DIN VDE 0530, Part 1, Section 6.
J. Indian Institute Science, vol. 62(a), pp. 83–88, Mar. 1980.
Kunstoffe, vol. 86, No. 1, pp. 73–78, 1996.
Capano et al.: "The Application of 'Zelec ECP' in Static Dissipative Systems", EOS/ESD Symposium Proceedings, pp. 224–230, 1990.
Glausch et al.: "Neuartige helle, leitfähige Pigmente auf Glimmer/Metalloxid–Basis", *Farbe & Lack,* 96 Jahrgang, Jun. 1990.

* cited by examiner

*Primary Examiner*—Robert Dawson
*Assistant Examiner*—Christopher M Keehan
(74) *Attorney, Agent, or Firm*—Harness, Dickey & Pierce, P.L.C.

(57) ABSTRACT

A corona shielding band having reproducible qualities and allowing only a small increase in dielectric losses in a winding of an insulation of electrical machine is made by impregnating a woven-type support material with an active resin solution containing an inorganic filler with a coating composed of antimony-doped tin oxide and then removing the solvent by a thermal processing to produce the corona shielding band.

28 Claims, No Drawings

GLOW PROTECTION BAND

BACKGROUND OF THE INVENTION

The invention is directed to a corona-shielding band for electrical machines, particularly high-voltage machines.

An electrical machine is essentially composed of a stator, which is constructed of what is referred to as the plate packet wherein insulated windings are inserted into prefabricated channels, as well as of a rotor that rotates in the stator. The sheet metal packet is composed of a specific plurality of individual sheets stacked on top of one another into which the channels are punched. The stator winding is inserted into these channels, and the winding is coated with a specific insulating system dependent on the demands. A typical insulating system for high-voltage machines comprises a principal insulation that is composed of mica bands that are wound around the conductor. In the channel region, the stator winding is provided with an outside corona protection (AGS), which has good electrical conductivities, in order to prevent partial discharges in this region. The outside corona protection is thereby conducted out beyond the plate packet, so that no discharges can occur given the slight spaces relative to the pressure plates and pressure fingers of the plate packet. The windings are also impregnated with an impregnation resin with an impregnation process (VPI process) which resin is then hardened.

The electrical conditions at the channel exit of high-voltage machines correspond to those of a sliding arrangement. One electrode, i.e. the outside corona protection grounded via the plate packet, ends shortly after the plate packet; and the other electrode, i.e. the conductor, in contrast, continues farther. This arrangement yields an increase of the field strength at the insulation surface at the end of the outside corona protection. The tangential field strength $E_T$ arising therefrom along the surface of the principal insulation leads to corona and sliding discharges when the dielectric strength of the air is exceeded, and these discharges potentially destroy the insulation. In practice, this is the case beginning with operating voltages >5 kV.

Without measures for field control, the potential of the individual surface elements of the principal insulation relative to the end of the outside corona protection is defined by the two capacitances $C_1$ (capacitance between the individual surface elements and the outside corona protection) and $C_0$ (capacitance of the insulation between the surface elements and the conductor) and the applied voltage. For the initial voltage $U_a$ at which the sliding discharges begin, the following derives:

$$U_a \approx E_d \sqrt{\frac{C_1}{C_0}}$$

whereby $E_d$ is the dielectric field strength of the surrounding medium. With air as ambient medium, $C_1$ becomes small compared to $C_0$ and the majority part of the voltage lies between the outside corona protection and the surface elements of the insulation. Given high-voltage machines having an operating voltage >5 kV, a coat, which has a defined, low conductivity, is therefore applied following the outside corona protection, and the surface capacitance $C_1$ is shorted by this coat. The charging current for the capacitance $C_0$ then generates a voltage drop as a result whereof the adjacent potential is gradually dismantled. This coat on the principal insulation is referred to as final corona protection (EGS) or potential control.

To this end, the insulations are usually provided with an electrically conductive layer having an adapted, specific electrical impedance. In practice, this ensues with lacquers or insulating bands to which silicon carbide is added as a conductive filler. This filler exhibits semiconducting properties in the doped condition and a highly voltage-dependent conductivity, and this means that the surface resistance of the corona protection layer decreases with increasing field strength and vice versa. This leads to a high conductivity of the final corona protection at the transition to the outside corona protection and to a low conductivity of the final corona protection at the transition to the insulation surface. A steady dismantling of the field strength up to the insulation surface is thus achieved. In practice, corona protection layers have proven themselves whose surface resistance, which is measured according to DIN IEC 167, lies between 800 and 5000 MΩ given 5 kV DC voltage.

Insulating bands, what are referred to as corona shielding bands, are usually employed for manufacturing the corona protection layer. These are composed of a carrier material composed of glass fabric or organic fabric material that is saturated with an epoxy resin (as a binding agent) that contains silicon carbide as an inorganic filler having an adaptive grain size and concentration. Silicon carbide (SiC) is employed as a conductive filler in corona shielding layers because, differing from metallic fillers, it allows the setting of the required, extremely low conductivities in the super-percolated range, and the conductivity therefore does not change significantly given processing-induced, slightly fluctuating filler concentrations. The silicon carbide is usually employed in a doped form in order to set the conductivity, particularly the voltage dependency of the conductivity, to the desired level. In practice, silicon carbide set p-conductively with aluminum has thereby proven itself. Commercially obtainable glycidylethers are employed as epoxy resins. The resins can contain an aminic hardening agent as well as a curing accelerator. Such corona shielding bands are known, for example, from the following publications: German Published Application 30 45 462, German Published Application 42 18 928 and U.S. Pat. No. 3,066,180.

The corona shielding band is wound overlapping around the outside corona protection in the region of the winding that closest to the iron core. Subsequently, the entire winding is then subjected to a VPI process (vacuum pressure impregnation) with an impregnation resin. This means that the corona shielding band that is employed must be compatible with this complex process. Thus, the band dare not contain any constituents that disturb the impregnation process or, respectively, give any such constituents off into the impregnation bath. Moreover, it must be uniformly integrated in the formed material arising after the curing so that partial discharges are avoided.

In technical employment, however, commercially obtainable corona shielding tapes which have silicon carbide as a conductive filler exhibit serious disadvantages. Thus, corona shielding tapes of the same type exhibit a great scatter in dielectric behavior (resistance level) which is dependent on the batch. This can probably be already found in the initial test of the conductivity of test members composed of a pure final corona protection; on the other hand, however, this can only be partly found at the completely insulated and VPI-impregnated windings as a result of corona discharges that occur. The technical manufacturing process of the silicon carbide is suspected as the cause. This is manufactured in a rotary tubular kiln in a reducing atmosphere from silicon carbide and carbon (Acheson process). Oxidic layers having different configurations form on the surface of the SiC particles that are formed, and these oxidic layers have a great influence on the conductivity. Dependent on the quality of the corona shielding, an unacceptable deterioration of the insulation due to increased dielectric. losses frequently results.

The conductive fillers such as lamp black, aluminum powder and silver powder that are usually technically utilized in plastics cannot be used in the present instance since they exhibit too high a specific conductivity.

SUMMARY OF THE INVENTION

An object of the invention is to make corona shielding bands available that can be manufactured in reproducible quality and that effect an optimally slight rise in the dielectric losses in the winding insulations of electrical machines.

This is inventively achieved by corona shielding bands that can be obtained in the following way.

a fabric-like carrier material is impregnated or, respectively, saturated with a solution of a reaction resin, whereby the solution also contains an inorganic filler that comprises a coating of antimony-doped tin oxide and also potentially contains a hardening agent and/or an accelerator;

following the impregnation (saturation), the solvent is removed as a result of thermal treatment, i.e. at elevated temperature.

Not only is the solvent removed as a result of the thermal treatment, but a pre-reaction also results so that the corona shielding band or, respectively, the reaction resin has hardly any stickiness and can therefore be handled in technical processes. Although a hardening does not yet occur, a "pre-reacted" reaction resin can already be present after the thermal treatment, i.e. a reaction resin in what is referred to as the B-condition. In this condition, the reaction resin can also be swelled or, respectively, dissolved by the impregnation resin in the later VPI process and can form a stable union therewith upon curing.

The temperature at which the thermal treatment ensues is dependent on the respectively utilized solvent, i.e. on the boiling point thereof, and on the reactivity of the reaction resin employed. Given, for example, employment of methylethylketone (boiling point 80° C.) that is preferably utilized as solvent, the thermal treatment ensues at a maximum temperature of approximately 110° C. For example, acetone, ethyl acetate, ethanol and toluol are suitable as solvents.

A critical feature of the invention is the specific filler of the corona shielding bands. This filler, which must be electrically conductive, is an inorganic material that comprises a coating of antimony-doped tin oxide (also referred to below as antimony-tin oxide); a type of mixed oxide is thereby present here. The proportion of the antimony in the mixed oxide advantageously amounts to 0.1 through 30% by weight. A filler having adequate semiconducting properties thus derives. Fundamentally, a pure tin oxide can also be utilized, whereby the electrical conductivity is established by a stoichiometric oxygen deficiency.

The semiconducting properties of antimony-doped tin oxide are known in and are described, for example, in conjunction with the employment thereof in high-voltage insulators (see J. Indian Inst. Sci., Vol. 62 (A), March 1980, pages 83 through 88) and in conductive thermal plastic compounds (see Kunststoffe, Vol. 86 (1996) 1, pages 73 through 78). Due to the high density of approximately 7 g/cm$^3$, corresponding fillers, however, are difficult to process. Moreover, there is the risk of inhomogeneities due to sedimentation, and this precludes their use in corona shielding layers for electrical machines.

Inorganic or, respectively, mineral fillers that are coated with antimony-doped tin oxide are known in and of themselves. They are utilized in thermal plastics and lacquers for EMS applications (electro-magnetical shielding), for example, in anti-static coats for electrical devices (see Farbe und Lack, Vol. 96 (1990) 6, pages 412 through 415 and EOS/ESD Symposium Proceedings, September 1990, pages 224 through 230).

Extensive investigations have shown that fillers coated with antimony-doped tin oxide are suitable as conductive additives in corona shielding bands for electrical machines and that, thus, the conductivity in corona shielding layers can be set very precisely and reproducibly according to the demands for high-voltage machines. Winding insulations for high-voltage machines can thus be manufactured whose dielectrical losses lie in the scope of the limits prescribed by DIN VDE 0530 Part 1. This, however, was extremely surprising and was therefore not predictable.

The filler content of the corona shielding bands of the invention generally amounts to 2.5 through 75% by weight, preferably 2.5 through 25% by weight, namely referred to the part of reaction resin as well as, potentially, hardening agent and/or accelerator.

Glass fabric and fabric of inorganic material preferably serve as carrier material, particularly in the form of fibers of polyesters or aromides, i.e. polyamides of aromatic diamines and aromatic dicarbonic acids. Insofar as they meet the demands made of insulating material for electrical machines, however, other organic fabric types can also be utilized, for example on the basis of polypropylene or fluoridated polymers. In order to keep the application onto the electrical winding as low as possible, fabric types having a GSM substance of 30 through 200 g/m$^2$ are usually employed.

All standard reaction resins such as alkyd resins, epoxy resins, iamide resins, polyester resins and silicone resins fundamentally come into consideration as binding agent, i.e. as the resin. As a result of the balanced property profile in view of dielectric properties, temperature stability and processing behavior as well as the good compatability with the insulating system, however, epoxy resins have proven themselves to be especially suitable. Aromatic di-glycidyl ethers and polyglycidyl ethers have thereby particularly proven themselves as the insulating materials in electrical machines due to the thermal resistance.

Insofar as a hardening agent is required at all, aminic compounds are particularly utilized as the hardening agent. These are preferably aromatic amines, particularly aromatic di-amines and borotrifluoride-amine adducts, for example with mono-ethyl amine and piperidine. In particular, imidazole derivatives can serve as the accelerators. Further accelerators that can be utilized are, for example, tertiary amine and ammonia compounds.

A certain flexibility of the corona shielding bands is advantageous for a problem-free processing because they can then be wound onto the insulating surface without forming folds and pockets. A slight self-stickiness is also advantageous so that work can be carried out without additional fixing with adhesive tapes.

The fillers coated with antimony-doped tin oxide are manufactured, for example, in such a way that hydraulizable antimony and tin compounds are introduced into an aqueous filler dispersion, and the coated filler is then dried and heated (in this respect, see U.S. Pat. No. 4,373,013). Another possibility comprises coating the filler with organic antimony and tin compounds that are subsequently thermally decomposed. Oxide layers having a thickness in the range from a few nanometers to about a few hundred micrometers can be produced with both methods. By way of example, let a layer thickness of approximately 30 nm be cited.

All organic materials that are usually utilized can be employed as the filler, such as $Al_2O_3$, $SiO_2$, $TiO_2$, $BaSO_4$, chalk, talcum, Kaolin, mica and titanates. Preferably, the filler is mica or a titanate such as potassium titanate, particularly in the form of whiskers.

The conductivity level of the coated fillers can be set on the basis of the content of antimony in the mixed oxide, on the basis of the layer thickness of the mixed oxide and on the basis of the grain size and the shape of the fillers. Usually, the antimony part in the mixed oxide amounts to up to 30% by weight; the layer thickness of the mixed oxide usually lies between 1 nm and a few μm.

The manufacturer of the corona shielding bands ensues according to the standard methods for the manufacture of insulating bands for electrical machines. Solutions of the reaction resins are thereby utilized wherein the semiconducting filler is dispersed (the mixtures of reaction resin, solvent and filler ready for processing as well as, potentially, hardening agents and/or accelerators are also referred to below as reaction resin compounds). The viscosity and, thus, the application onto the fabric materials is defined by the concentration of the reaction resin and of the filler in the solution. The fabric materials can, as bands having a greater or lesser width, either be drawn through the solution or sprayed with the solution. The band then passes through a horizontal or vertical drying path at elevated temperature in order to remove the solvent. Subsequently, the band is wound up.

DESCRIPTION OF THE PREFERRED EMBODIMENTS

The invention shall be explained in yet greater detail on the basis of exemplary embodiments (MT=mass parts).

Manufacture of Reaction Resin Compounds

For manufacturing a reaction resin compound, the reaction resin is dissolved in a solvent at room temperature. The calculated quantities of hardening agent or, respectively, accelerator are then potentially added to the solution and dissolved while stirring. Subsequently, the calculated part of an electrically conductive filler is uniformly distributed in the resin solution with the assistance of a dissolver. The constituents employed in the examples are compiled in Table 1.

TABLE 1

| Constituents | |
|---|---|
| Epoxy Novolak | EP 1 |
| EP value: 5.66 mol/kg | |
| Viscosity at 80° C.: 1500 mPa·s | |
| Diglycidyl ether on a basis of bisphenol A | EP 2 |
| EP value: 0.33 mol/kg | |
| Viscosity (40 wt. % in MEK): 200 mPa·S at 25° C. | |
| Diglycidyl ether on a basis of bisphenol A | EP 3 |
| EP value: 0.61 mol/kg | |
| Viscosity (40 wt. % in MEK): 60 mPa·s at 25° C. | |
| Diglycidyl ether on a basis of bisphenol A | EP 4 |
| EP value: 12 mol/kg | |
| Viscosity (40 wt. % in MEK): 15 mPa·s at 25° C. | |
| Diglycidyl ether on a basis of bisphenol A (80% in MEK) | EP 5 |
| EP value 2.2 mol/kg | |
| Viscosity: 1000–3000 mPa·s at 25° C. | |
| Methyl ethyl ketone (solvent) | MEK |

TABLE 1-continued

| Constituents | |
|---|---|
| 4,4'-diamine-diphenyl sulfone (hardener) | DDS |
| Sulfanilamide (hardener) | SAM |
| adduct of trimethylolpropantriacrylate and ethyl piperazine (hardener) | TEP |
| $BF_3$ piperidine adduct (hardener) | BFP |
| 2-methylimidazole (accelerator) | 2-MI |
| Potassium titanate whiskers, coated with antimony-doped tin oxide | F 1 |
| Density: 44.6 g/cm³, length: 10 . 20 μm, diameter: 0.4–0.7 μm | |
| Mass ratio Sb:Sn = 12:88 | |
| Mica coated with antimony-doped tin oxide | |
| Density: 3.6 g/cm³, particle size <15 μm, mass ratio mica: antimony/tin oxide = ca. 1:1 | |
| Mass ratio Sb:Sn = 15:85 | |

Manufacture of Corona Shielding Bands

For manufacturing corona shielding bands, a fabric band as the carrier material is drawn through a container filled with the reaction resin compound at a defined speed and is thereby impregnated. The resin supply is continuously agitated before and during the trial implementation in order to prevent a depositing of the conductive filler. After the impregnation, the fabric band is conducted through a drying tower with four hot zones that can be regulated independently of one another. Work was carried out given the following drying conditions (MEK as solvent): 60° C., 90° C., 110° C. and 70° C.; band velocity: 20 cm/min.

Determination of the Surface Resistance of Cured Corona Shielding Bands

The corona shielding bands manufactured in the described way are respectively wrapped single-ply with a 50% overlapping onto a reaction glass of Duranglass (according to DIN 12395) having an outside diameter of 30 mm. Subsequently, the samples are hardened at 160° C. in the pre-heated ambient air kiln. The electrodes needed for the electrical contacting are annularly painted on with highly conductive, air-drying silver conductive paint at a 10 mm spacing according to DIN IEC 167, VDE 0303 Part 61 Section 7; the power terminals are implemented with bare copper wire. The resistance measurement ensues according to DIN IEC 167, VDE 0303 Part 31 with a highly constant DC voltage source in the range from 1 through 6 kV in 1 kV steps.

EXAMPLES 1 THROUGH 5

The influence of the filler part on the electrical properties of the corona shielding bands is investigated. Potassium titanate whiskers coated with antimony/tin oxide serve as the electrically conductive filler. The carrier material is a polyester band (width 20 mm, thickness 0.1 mm, GSM substance 71.5 g/m²). The composition of the reaction resin compounds employed can be derived from Table 2.

TABLE 2

| Example | EP 1 MT | MEK MT | DDS MT | 2-MI MT | F 1 MT | Filler part %[1] |
|---|---|---|---|---|---|---|
| 1 | 100 | 100 | 26.57 | 0.372 | 19.04 | 15.0 |
| 2 | 100 | 100 | 26.57 | 0.372 | 15.87 | 12.5 |
| 3 | 100 | 100 | 26.57 | 0.372 | 12.69 | 10.0 |
| 4 | 100 | 100 | 26.57 | 0.372 | 9.52 | 7.5 |
| 5 | 100 | 100 | 26.57 | 0.372 | 6.35 | 5.0 |

[1] referred to the organic solids parts of the reaction resin compound

The results of the electrical test (determination of the surface resistance) are compiled in Table 3. It can be seen that the surface resistance decreases with increasing voltage. The surface resistance and, thus, the control behavior of the cured corona shielding bands resulting therefrom can be set over a range of several powers of ten via the part of the filler in the corona shielding band. Given a part of approximately 10% of antimony/tin oxide-coated potassium titanate whiskers, a surface resistance within the level usually required for corona shielding bands is achieved at 5 kV.

TABLE 3

| | Surface resistance in MΩ at | | | | |
|---|---|---|---|---|---|
| Example | 1 kV | 2 kV | 3 kV | 4 kV | 5 kV | 6 kV |
| 1 | 550 | 120 | 50 | | | |
| 2 | 7·10³ | 930 | 303 | 170 | 140 | 130 |
| 3 | 1.4·10⁶ | 100·19³ | 23·10³ | 8·10³ | 3.9·10³ | 2.5·10³ |
| 4 | | 17·10⁶ | 1·10⁶ | 130·10³ | 31·10³ | 14·10³ |
| 5 | | | 200·10⁶ | 80·10⁶ | 38·10⁶ | 20·10⁶ |

EXAMPLES 6 THROUGH 8

The influence of the filler part on the electrical properties of the corona shielding bands is investigated. Mica coated with antimony/tin oxide serves as the electrically conductive filler. The carrier material is a polyester band (width 20 mm, thickness 0.1 mm, GSM substance 71.5 g/m²). The composition of the reaction resin compounds employed can be derived from Table 4.

TABLE 4

| Example | EP 1 MT | MEK MT | DDS MT | 2-MI MT | F 2 MT | Filler part %[1] |
|---|---|---|---|---|---|---|
| 6 | 100 | 100 | 26.57 | 0.372 | 19.04 | 15.0 |
| 7 | 100 | 100 | 26.57 | 0.372 | 12.69 | 15.0 |
| 8 | 100 | 100 | 26.57 | 0.372 | 6.35 | 15.0 |

[1]referred to the organic solids parts of the reaction resin compound

The results of the electrical test (determination of the surface resistance) are compiled in Table 5. It can be seen that the surface resistance decreases with increasing voltage. The surface resistance and, thus, the control behavior of the cured corona shielding bands resulting therefrom can be set over a range of several powers of ten via the filler part in the corona shielding band. Given a part of approximately 10% of antimony/tin oxide-coated mica, a surface resistance within the level usually required for corona shielding bands is achieved at 5 kV.

TABLE 5

| | Surface resistance in MΩ at | | | | |
|---|---|---|---|---|---|
| Example | 1 kV | 2 kV | 3 kV | 4 kV | 5 kV | 6 kV |
| 6 | 715 | 60 | | | | |
| 7 | 946·10³ | 125·10³ | 27·10³ | 5.3·10³ | 1.2·10³ | 510 |
| 8 | 54·10⁶ | 40·10⁶ | 21·10⁶ | 15·10⁶ | 9·10⁶ | 6·10⁶ |

EXAMPLES 9 THROUGH 12

The influence of different epoxy resin constituents on the electrical properties of the corona shielding bands is investigated. Potassium titanate whiskers coated with antimony/tin oxide serve as the electrically conductive filler. The carrier material is a fiber glass band (width 20 mm, thickness 0.1 mm, GSM substance 139 g/m²). The composition of the reaction resin compounds employed can be derived from Table 6.

TABLE 6

| Example | Reaction resin | Solvent | Hardener/ accelerator | Filler | Filler part[1] |
|---|---|---|---|---|---|
| 9 | EP 1 100 MT EP 2 62.5 MT | MEK 180 MT | DDS/2-MI 27.28 MT/0.386 MT | F1 19.05 MT | 10.0% |
| 10 | EP 3 50 MT EP 4 50 MT | MEK 120 MT | DDS/2-MI 4.2 MT/0.06 MT | F1 10.43 MT | 10.0% |
| 11 | EP 1 100 MT EP 3 62.5 MT | MEK 135 MT | DDS/2-MI 28.397.28 MT/ 0.39 MT | F1 19.09 | 10.0% |
| 12 | EP 5 100 MT | MEK 80 MT | DDS/2-MI 10.35 MT/0.145 MT | F1 11.05 MT | 10.0% |

[1]referred to the organic solids parts of the reaction resin compound

The results of the electrical test (determination of the surface resistance) are compiled in Table 7. It can be seen that the influence of the epoxy resin constituents on the resulting surface resistance is only slight. Given a part of approximately 10% antimony/tin oxide-coated potassium titanate whiskers, a surface resistance within the level usually required for corona shielding bands is achieved at 5 kV.

TABLE 7

| | Surface resistance in 10³ MΩ at | | | | |
|---|---|---|---|---|---|
| Example | 1 kV | 2 kV | 3 kV | 4 kV | 5 kV | 6 kV |
| 9 | 760 | 200 | 29 | 5.6 | 1.9 | 0.78 |
| 10 | 950 | 310 | 43 | 7.8 | 2.3 | 1.1 |
| 11 | 450 | 290 | 17 | 3.0 | 1.3 | 0.6 |
| 12 | 1200 | 450 | 20 | 5.3 | 2.0 | 0.9 |

EXAMPLES 13 THROUGH 16

The influence of different hardening constituents on the electrical properties of the corona shielding bands is investigated. Potassium titanate whiskers coated with antimony/tin oxide serve as electrically conductive filler. The carrier material is a polyester band (width 28 mm, thickness 0.1 mm, GSM substance 71.5 g/m²). The composition of the reaction resin compounds employed can be derived from Table 8.

TABLE 8

| Example | EP 1 MT | MEK MT | Hardener/ accelerator | F 1 MT | Filler part[1] |
|---|---|---|---|---|---|
| 13 | 100 | 70 | TEP 4 MT | 10.4 | 10.0% |
| 14 | 100 | 70 | DDS/2-MI 11.392 MT/0.372 MT | 11.18 | 10.0% |
| 15 | 100 | 70 | BFP 3 MT | 10.3 | 10.0% |
| 16 | 100 | 100 | SAM/2-MI 18 MT/0.152 MT | 11.82 | 10.0% |

[1]referred to the organic solids parts of the reaction resin compound

The results of the electrical test (determination of the surface resistance) are compiled in Table 9. It can be seen that the influence of the hardener/accelerator constituent on the resultant surface resistance is only slight. Given a part of approximately 10% antimony/tin oxide-coated potassium titanate whiskers, a surface resistance within the level usually required for corona shielding bands is achieved at 5 kV.

TABLE 9

| | Surface resistance in $10^3$ MΩ at | | | | | |
|---|---|---|---|---|---|---|
| Example | 1 kV | 2 kV | 3 kV | 4 kV | 5 kV | 6 kV |
| 13 | 940 | 125 | 27 | 5.3 | 1.2 | 0.5 |
| 14 | 720 | 50 | 12 | 4.6 | 2.4 | 1.5 |
| 15 | 2200 | 150 | 20 | 5.3 | 2.0 | 0.9 |
| 16 | 1500 | 100 | 10 | 3.2 | 1.8 | 1.1 |

EXAMPLES 17 THROUGH 21

The warehousing stability of the corona shielding bands is investigated. To that end, corona shielding bands corresponding to example 15 are stored at room temperature, and specimens for the determination of the surface resistance are produced after different warehousing times (see Table 10). The composition of the reaction resin compound employed can be derived from Table 8.

TABLE 10

| Example | Storage time in weeks at room temperature |
|---|---|
| 17 | 1 |
| 18 | 2 |
| 19 | 4 |
| 20 | 8 |
| 21 | 16 |

The results of the electrical test (determination of the surface resistance) are compiled in Table 11. It can be seen that the surface resistance remains constant over nearly the entire warehousing time and lies within the level usually required for corona shielding bands.

TABLE 11

| | Surface resistance in MΩ at | | | | | |
|---|---|---|---|---|---|---|
| Example | 1 kV | 2 kV | 3 kV | 4 kV | 5 kV | 6 kV |
| 15 | $2.2 \cdot 10^6$ | $150 \cdot 10^3$ | $20 \cdot 10^3$ | $5.3 \cdot 10^3$ | $2.0 \cdot 10^3$ | $0.9 \cdot 10^3$ |
| 17 | $3.2 \cdot 10^6$ | $190 \cdot 10^3$ | $31 \cdot 10^3$ | $7.1 \cdot 10^3$ | $3.5 \cdot 10^3$ | $1.4 \cdot 10^3$ |
| 18 | $2.6 \cdot 10^6$ | $160 \cdot 10^3$ | $25 \cdot 10^3$ | $6.4 \cdot 10^3$ | $2.6 \cdot 10^3$ | $1.1 \cdot 10^3$ |
| 19 | $3.5 \cdot 10^6$ | $240 \cdot 10^3$ | $30 \cdot 10^3$ | $8.3 \cdot 10^3$ | $4.1 \cdot 10^3$ | $1.5 \cdot 10^3$ |
| 20 | $1.7 \cdot 10^6$ | $120 \cdot 10^3$ | $15 \cdot 10^3$ | $3.6 \cdot 10^3$ | $2.0 \cdot 10^3$ | $0.8 \cdot 10^3$ |
| 21 | $2.1 \cdot 10^6$ | $170 \cdot 10^3$ | $22 \cdot 10^3$ | $5.0 \cdot 10^3$ | $1.9 \cdot 10^3$ | $1.0 \cdot 10^3$ |

EXAMPLE 22

The dielectric properties of a commercially obtainable corona shielding band on an epoxy resin basis with silicon carbide as electrically conductive filler (Example 22) are compared to a corona shielding band of the invention (Example 9). To that end, the corona shielding bands are wound single-ply, with a 50% overlapping onto the principal insulation of 10 kV coils. The electrical contacting is produced by overlapping the outside corona protection. The 10 kV coils are subsequently subjected to a VPI process and are then cured. A low-viscosity mixture of bisphenol-A-diglycidylether and tetrahydrophathalic acid anhydride serves as the impregnation resin. The apparent charge $Q_{s\ max}$ is defined at the impregnated coils as the criterion for the partial discharge behavior, and the dielectric loss factor tan δ in the range from 2 through 10 kV (RMS) is identified in 2 kV steps.

The results compiled in Table 12 and 13 show that a technologically advantageous, lower partial discharge level occurs at the channel end given the corona shielding band of the invention compared to the conventional corona shielding band containing SiC, and that this corona shielding band exhibits the clearly lower, voltage-dependent loss factor that is desired.

TABLE 12

| | Apparent charge $Q_{s\ max}$ in nC at | | | | |
|---|---|---|---|---|---|
| Example | 2 kV | 4 kV | 6 kV | 8 kV | 10 kV |
| 22 | 0.1 | 0.4 | 2 | 3 | 3.3 |
| 9 | 0.1 | 0.4 | 1.1 | 1.1 | 1.1 |

TABLE 13

| | tan δ $\cdot 10^{-3}$ at | | | | |
|---|---|---|---|---|---|
| Example | 2 kV | 4 kV | 6 kV | 8 kV | 10 kV |
| 22 | 16 | 21 | 28 | 34 | 38 |
| 9 | 9 | 9 | 10 | 13 | 17 |

What is claimed is:

1. A method of forming a corona shielding band for electrical machines, said method comprising the steps of impregnating a fabric carrier material with a solution of a first constituent containing a reaction resin in a solvent that contains an inorganic filler coated with antimony-doped tin oxide, said solution containing a second constituent selected from accelerators and hardening agents to form an impregnated carrier material, thermally treating the impregnated material to remove the solvent.

2. A method according to claim 1, wherein the contents of the filler material amounts to 0.5 through 75% by weight of the sum of the first and second constituents.

3. A method according to claim 1, wherein the contents of the filler amounts to 2.5 through 25% by weight of the sum of the first and second constituents.

4. A method according to claim 1, wherein part of the antimony in the antimony-doped tin oxide amounts to 0.1 through 30% by weight.

5. A method according to claim 1, wherein the carrier material is a fabric selected from a glass fabric and a fabric of organic material.

6. A method according to claim 1, wherein the carrier material is a fabric of organic material selected from polyester and aromides.

7. A method according to claim 1, wherein the reaction resin is an epoxy resin.

8. A method according to claim 7, wherein the epoxy resin is selected from an aromatic diglycidyl ether and a polyglycidyl ether.

9. A method according to claim 1, wherein the filler is selected from a mica and a titanate.

10. A method according to claim 1, wherein the hardening agent is selected from an aromatic amine and a borotrifluoride amine-adduct.

11. A method according to claim 1, wherein the accelerator is an imidazole derivative.

12. A method of forming a corona shielding band for electrical machines comprising the steps of providing a fabric carrier material, impregnating the fabric carrier material with a solution of a reaction resin in a solvent containing an inorganic filler coated with antimony-doped tin oxide to form an impregnated carrier material, and removing the solvent from the impregnated carrier material with a thermal treatment.

13. A corona shielding band for high-voltage electrical machines, said band comprising a fabric carrier material impregnated with a reaction resin containing an inorganic filler coated with antimony-doped tin oxide, wherein the corona shielding band is virtually non-sticky based upon a thermal treatment following impregnation.

14. A corona shielding band according to claim 13, wherein the content of the filler amounts to approximately 2.5 through 75% by weight of the reaction resin.

15. A corona shielding band according to claim 13, wherein the content of the filler is in a range of 2.5 through 25% by weight of the reaction resin.

16. A corona shielding band according to claim 13, wherein the part of antimony in the antimony-doped tin oxide is 0.1 through 30% by weight.

17. A corona shielding band according to claim 13, wherein the carrier material is selected from a glass fabric, a polyester fabric and an aromide fabric.

18. A corona shielding band according to claim 13, wherein the reaction resin is an epoxy resin selected from a group consisting of aromatic diglycidyl ether and aromatic polyglycidyl ether.

19. A corona shielding band according to claim 13, wherein the filler is selected from mica and titanate.

20. A corona shielding band according to claim 13, which includes a hardening agent selected from aromatic amine and borotrifluoride amine-adduct and an accelerator comprising an imidazole derivative.

21. The method of claim 1, wherein the thermal treatment further produces a virtually non-sticky corona shielding band.

22. The method of claim 1, wherein the temperature of the thermal treating is dependent on the solvent.

23. The method of claim 1, wherein the temperature of the thermal treating is dependent on the reactivity of the resin.

24. The method of claim 12, wherein the thermal treatment further produces a virtually non-sticky corona shielding band.

25. The method of claim 12, wherein the temperature of the thermal treating is dependent on the solvent.

26. The method of claim 12, wherein the temperature of the thermal treating is dependent on the reactivity of the resin.

27. The corona shielding band of claim 13, wherein the temperature of the thermal treatment is dependent on a solvent used in the impregnation of the fabric carrier material.

28. The corona shielding band of claim 13, wherein the temperature of the thermal treatment is dependent on the reactivity of the resin.

* * * * *